INVENTORS
Cornelis H. Japikse
Benjamin Lawrence
BY Watson, Cole, Grindle & Watson
ATTORNEYS

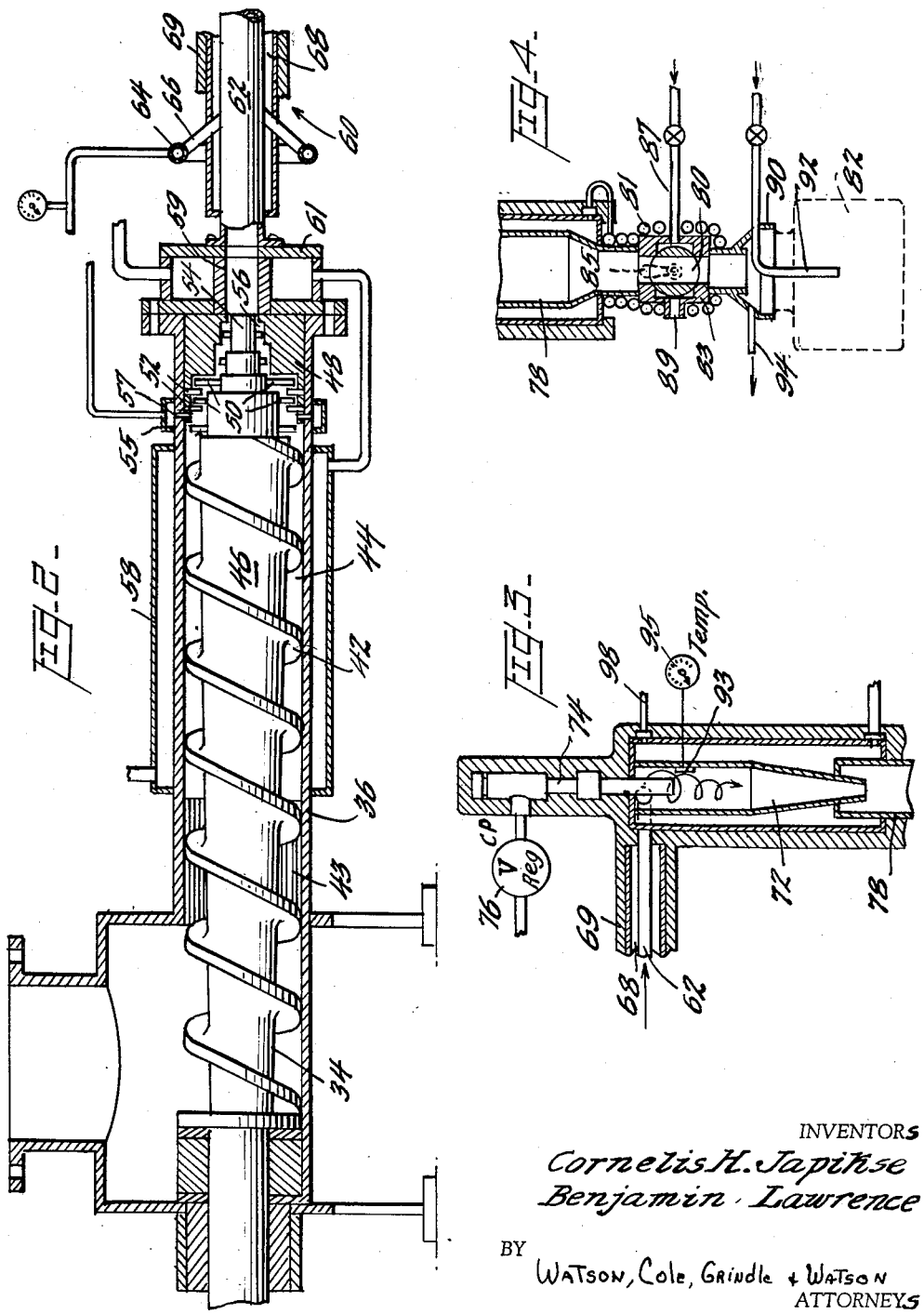

3,159,493
METHOD OF STERILIZING FLOUR WITH MINIMUM PHYSICOCHEMICAL CHANGE
Cornelis H. Japikse and Benjamin Lawrence, Springfield Township, Hamilton County, Ohio, assignors to The Procter & Gamble Company, Cincinnati, Ohio, a corporation of Ohio
Filed Dec. 31, 1962, Ser. No. 248,619
8 Claims. (Cl. 99—216)

This invention relates to a process for effecting essential sterilization of flour and the like without simultaneously causing physicochemical changes of a major nature in the flour.

At the present time, there is high commercial interest in the preparation and sale of a variety of prepared food products which can be used directly from the package, eliminating the tedious chore of compounding and mixing by the housewife. In the case of products of the type containing flour and a significant level of moisture, i.e. above that ordinarily found in "dry" pulverulent mixtures, contamination by microorganisms presents a continuing problem, particularly where refrigerated storage is not contemplated. Examples of such products are canned batters for cakes, pancakes, et cetera, and packaged doughs for pie crusts, rolls, biscuits, and so on. Even though most of the microorganisms present in these products are normally destroyed before actual ingestion by the cooking or baking operation, their presence in significant quantities prior to baking is undersirable for a number of reasons, including the possibility of an undesirable effect upon the properties of the product, either in the raw or baked state.

Reasonably effective techniques are available to the milling industry to eliminate contamination of flour by insect life but these techniques do not extend to the microscopic organisms, which, by the very nature of the milling process and the grain employed therein are inevitably present in commercial flour. When the flour is compounded into a culinary product of relatively high moisture content, which may remain in distribution channels for several months, ample opportunity is afforded for extensive multiplication of the microorganisms introduced for the flour or other ingredients. Obviously, a reputable manufacturer cannot run the risk of even a limited number of packages of his products failing to meet high standards of edibility. There is, therefore, an urgent need for ways to solve the problem of microorganism contamination of culinary products of the type already indicated.

Several approaches to a solution of this problem are apparent. One can, for example, adopt an attitude of resignation toward the microorganism population initially present and concentrate on inhibiting the growth of that population; this approach has, in fact, received much attention. However, the few chemical inhibitors resulting from these efforts that have been approved for human consumption are not effective against the full spectrum of microorganisms, especially at the very low concentrations currently permissible. Moreover, they tend to affect adversely the odor and taste of the product.

A more promising alternative to that just described is to attack the problem at its source by treatment calculated to render as microorganism-free as possible those product constituents which represent serious sources of contamination. The present invention utilizes this approach as to flour which is a prime offender in this respect. Of the various known techniques for sterilizing organic material, i.e. by means of heat, radiation, filtration or chemicals, only heat would appear to offer much hope of success on a commercial scale at the present state of the art.

However, flour is an extremely difficult material to process by any form of treatment utilizing elevated temperatures. In the first place, it possesses extremely poor heat transfer characteristics and when processed in bulk is liable to be burned in localized areas before other areas achieve treatment temperature. Secondly, the destruction of bacteria, fungi, spores and like organisms by heat can be attributed in large measure to the denaturation of the protein of the organism or the inactivation of certain enzymes essential to its life. Since the functional properties of flour depend essentially upon its protein content, it is to be expected that the application to flour of heat in sufficient degree and duration to destroy all microorganisms present therein would have a corresponding adverse effect upon the functionality of the flour for its intended purpose in the culinary product. Thirdly, the use of hot aqueous liquids as a heat transfer medium in direct contact with the flour is precluded by the strong tendency of flour to gelatinize in the presence of water well before sterilizing temperatures, thereby severely limiting the choice of techniques available to achieve the desired goal. Consequently, it is not at all unexpected that procedures for sterilizing flour by means of heat previously suggested in the art, if effective from the standpoint of microorganism destruction, have resulted in the flour being "cooked" to a more or less degree. "Cooking" is an indefinite word at best, having a variety of connotations to those skilled in the art. However, as the term is employed here, it has reference to those irreversible physicochemical changes produced in flour by heat and/or moisture, such as coagulation and insolubilization of the protein in the flour, gelatinization and loss of birefringence of the starch content, a distinct tendency to absorb water, and so on.

The present invention is based upon the discovery that a limited and critical area of processing conditions exists wherein flour can be processed to at least substantially eliminate therefrom all microorganisms in viable form with a minimum irreversible change in the physicochemical properties of the flour, i.e. without damaging its functionality for baking purposes to an unacceptable extent. In accordance with the invention, flour contaminated with microorganisms is heated as rapidly as is consistent with a generally uniform change in the flour temperature in a given processing system to a temperature within the range of about 260–310° F. in an atmosphere containing steam or water vapor in the proportion about 10–80 mol percent and maintained under a pressure of about 5–40 p.s.i.g., retained in said atmosphere at such temperature and pressure for a time of about 1–10 minutes and sufficient to destroy said microorganisms at least substantially, and then cooling the flour as soon as possible to a temperature at least below its minimum degradation point while avoiding recontamination thereof. It has been found unexpectedly that water vapor within this temperature range and under this pressure has a selective or directed effect upon the microorganisms, even when in the protective spore state, resulting in the essential destruction of the microorganisms without a corresponding destructive action upon the functional characteristics for baking purposes of the flour.

As employed herein, the term "flour" is intended to embrace farinaceous materials comprised by protein and starch generally. Thus, it includes but is not limited to flours and/or meals derived from wheat, corn and other cereal grains, such as rye, barley, as well as from certain legumes, such as soy beans, peanuts and the like.

In order that a condition of essential sterility be achieved with the class of materials just described within a period of time providing reduced opportunity for heat damage to the flour to occur, it has been found that the temperature to which the flour is heated should fall generally within the range of about 260–310° F. At levels significantly below the lower end of this range, the chance of an undesirable amount of the microbial spores remaining in a viable state is increased. Similarly, the likelihood of heat damage increases as the upper end of the range is materially exceeded. On the other hand, repeated experimentation has established that this general range represents the optimum balance or compromise between the conflicting needs of a relatively high temperature to achieve maximum microbial destruction and a relatively low temperature to avoid heat damage to the flour. It should perhaps be emphasized that the temperature here is of the flour itself; consequently, the temperature of the ambient atmosphere or other heating medium may differ somewhat from this range. Preferably, the treatment temperature is from about 280–300° F., and 290–300° F. has been found to be optimum.

Ideally, the individual particles of the flour undergoing treatment should be brought to operative temperature instantaneously or as closely thereto as is reasonably possible. As a practical matter, however, this goal is difficult, if not impossible, to obtain. Thus, in order to be realistic, it is to be expected that some definite period of time will lapse before the actual flour temperature will rise to the desired level. Exactly how much time can be tolerated in heating up the flour cannot be prescribed with exactitude since one could obviously hold the flour for almost indefinite periods at relatively low temperatures below the heat degradation point of the flour protein and/or the gelatinization point of the flour starch. Once either or both of these points have been reached, further heating should proceed at a relatively rapid rate. It will be appreciated that while some latitude is possible here, the preferred practice is to bring the flour to sterilization temperature as quickly as possible, say within about 3–5 minutes or, even better, in less than about one minute, and the particular mode of treatment for subjecting the flour to the combination of conditions described above is most advantageously selected with this goal in mind.

In similar fashion, absolute uniformity in the rate of temperature elevation within the entire mass of flour, in the case of a batch operation, or all of the flour particles exposed to heat at a given time, in the case of a continuous operation, although representing the ideal goal is rarely feasible in actual practice due to the inherently poor heat transfer characteristics of flour already mentioned. In general, the results of the treatment will be satisfactory so long as all of the flour actually being exposed to the heat reaches the minimum effective temperature before the most remote localized portion thereof begins to char, i.e. acquires a brown color, or more preferably, begins to exceed the maximum of the specified temperature range. It need hardly be said, of course, that the smaller the temperature differential from portion to portion of the flour being treated, the more consistent will be its performance in the preparation of final products.

The extensive experimentation upon which the present invention is based supports the generalization that a minimum time of exposure of about one minute to a temperature within the stated range is necessary to destroy the normal incidence of microorganism contamination, including spores, to an essential degree. In the case of extremely efficient modes of treatment wherein the flour is contacted with the heating medium in a highly dispersed state, e.g. in the form of a fluidized bed or stream, the exposure time may occasionally be reduced still further and yet achieve essential sterility. Any such reduction, however, involves an incidental risk of survival of the more resistant types of bacteria, i.e. the spore-forming varieties. The other extreme is governed primarily by practical considerations and the figure of about 10 minutes must be viewed as more or less arbitrarily fixed to include the great majority of experimental cases displaying substantial sterility but to exclude those cases where the degree of thermal degradation of the flour was excessive. As a consequence, it will be understood that in some few instances an exposure of as much as ten minutes may be unnecessary or even undesirable. Only rarely will it be necessary to exceed this limit in order for the flour to be rendered essentially sterile; more generally, any slight additional reduction in the incidence of contamination that might eventuate does not justify the concomitant increase in the risks of an undesirable amount of damage to the functionality of the flour. The operating point chosen within the range depends in large measure on the specific end use to be made of the treated flour. As might be expected from a knowledge of chemical processing broadly, the time and temperature of the present treatment are more or less inversely related with shorter times normally needing higher temperatures and vice versa, but this is obviously not a hard and fast rule from what has already been said.

The presence of steam, i.e. water vapor, in the atmosphere in which the flour is maintained is an essential requirement to the attainment of the basic objectives as herein outlined. The reasons for this are by no means completely understood although it is known that bacteria and/or molds are more sensitive or susceptible to the effect of heat in the presence of water vapor. Whatever the reason, and the invention is not to be construed as confined to any precise explanation, this has been found to hold true in practice. The amount of steam may vary as low as about 10 mol percent and as high as about 80 mol percent with about 30–75 mol percent being a more usual range. Below about 10 mol percent, the amount of steam present is too small to make any significant contribution. At levels above about 80 mol percent, on the one hand, the tendency for water to be condensed upon the flour under some desirable operating conditions often creates serious difficulties, particularly in connection with certain modes for continuous processing. Moreover, it is always better to avoid wetting the flour. In the processing of isolated small batches, an atmosphere composed exclusively of steam could perhaps be tolerated, but any advantage of a higher content of steam does not normally warrant the increased cost and the likelihood of practical problems arising therefrom.

The composition in the remainder of the prevailing atmosphere does not appear to matter greatly provided it is inert with respect to flour under the conditions of treatment. Thus, any of the common inert gases qualify for admixture, either alone or in combination, with steam to form the steam-containing atmosphere of the invention. Among such inert gases may be mentioned air, nitrogen and carbon dioxide. Air, of course, is readily available at nominal cost and is preferred.

The provision of the concentration of steam needed in the treatment atmosphere for good sterilization means that the treatment will normally be carried out under superatmospheric pressure. This follows from the fact that the system in which the flour is treated will usually be isolated from its surroundings, in either an absolute or relative sense, in order to maintain the desired atmosphere. Consequently, pressurization is desirable to achieve relative isolation of a dynamic system, i.e. a continuous system wherein the gaseous mixture forming the treatment atmosphere is provided at one end and exhausted to the surroundings at the other, or may be created as a result of a static system being heated to treatment temperature. The extent of pressure may be varied considerably consistent with the need for avoiding contact of the flour with significant quantities of condensed water. A range of pressure found satisfactory for the great majority of cases is 5–40 p.s.i.g. 10–30 p.s.i.g. is preferred. In the case of dynamic systems where the pressure may vary, at least the average pressure, and better yet the minimum pressure, should fall within this range.

After the treatment has continued for the selected period, it is terminated by cooling the flour. By and large, the considerations discussed in connection with heating the flour to treatment temperature apply with equal force here but in reverse, of course. Hence, it is preferred that the flour be cooled to a point precluding the possibility of heat damage, which will normally be below the degradation point of the starch, i.e. about 130–140° F., as quickly as can conveniently be done under the circumstances. Some delay, say up to about 10 minutes, in the speed of achieving this result can, and will ofttimes have to, be tolerated for practical reasons, but its extent should be minimized for best results. Five minutes or less is preferred and one minute or less is better yet, although the latter is difficult to achieve when the flour is handled in bulk. Some adjustment of heating temperature or time is frequently desirable to compensate for different modes of cooling and heat exposure differences caused thereby. Often, it will be most expedient to cool directly to room temperature but whether or not such is the case will depend chiefly upon the nature of subsequent processing. The manner of cooling may be forced or natural. During the cooling step and indeed during all subsequent handling and processing, care should be exercised to maintain aseptic conditions in order to eliminate the possibility of serious recontamination. Thus, the treated flour should be collected and/or stored in sterile containers, etc. The invention, as already has been stated, is concerned with the sterilization of flour as such and is not peculiarly related to any particular end use or to precise procedures for formulating ultimate products. Specific details of those products in which the treated flour might be used to advantage and what measures, including those concerned with maintaining sterility, might be used in their production are, therefore, outside the scope of this disclosure.

Up to this point, the description has been devoted to process variables applicable to the practice of the invention without regard to any specific system or mechanical context adapted for such practice since in its broadest conception, the invention is capable of being carried out in a number of different ways. In fact, the only important restriction upon the choice of system or apparatus, apart from those which are obviously necessary to the attainment of the process variables, is that the flour must be disposed, manipulated, or otherwise maintained in a state or form conducive to a substantially uniform rate of heat absorption or temperature increase. This limitation has been found to be satisfied by working with the flour, for example, in small batches, a thin layer, or a constantly agitated mass, especially as a fluidized bed or stream. Other modes of overcoming the poor heat transfer property of flour will occur to the expert.

In other respects, a wide choice of possibilities are available. To mention only a few, the steam-containing atmosphere may supply some or all of the heat to be absorbed by the flour, or an external source of heat, such as a generator of high frequency electrical waves or means utilizing the high dielectric quality of the flour, can be employed. The water vapor content of the treatment atmosphere can be constituted in whole or in part by steam obtained from an independent source and admixed in advance with the inert gases thereof. Alternatively, the water vapor content can be derived in situ from the moisture content of the flour in the state obtained from the miller or augmented, if necessary, by a preliminary humidification step. The desired pressure can be imposed upon the treatment atmosphere by completely sealing the system from its surroundings, by providing a pressure relief valve adapted to maintain a predetermined pressure, or by flooding or sweeping the system with a suitable gaseous mixture in sufficient quantity to create the necessary pressure differential.

No attempt shall be made herein to describe all of the possible apparatus or systems in which the present process could conceivably be carried out. However, in order to give the person skilled in the art a clearer understanding of how the invention might be put into operation on a practical basis, one specific system has been illustrated in the accompanying drawings and shall now be described. While this particular mode of operation has been found to be especially useful and effective, its inclusion here is for the purpose of explanation and illumination, no implication that the scope of the invention is necessarily limited thereto being intended.

In the drawing,

FIG. 2 is a detailed view of the preferred feeding mechanism for fluidizing the flour in the arrangement of FIG. 1;

FIG. 3 is a enlarged detail view in cross section of the upper end of the cyclone in which the flour is removed from the fluidizing stage; and FIG. 4 is a view similar to FIG. 3 of the lower end of the cyclone, showing one form of valve for removing the treated flour from the system.

Figure 1:
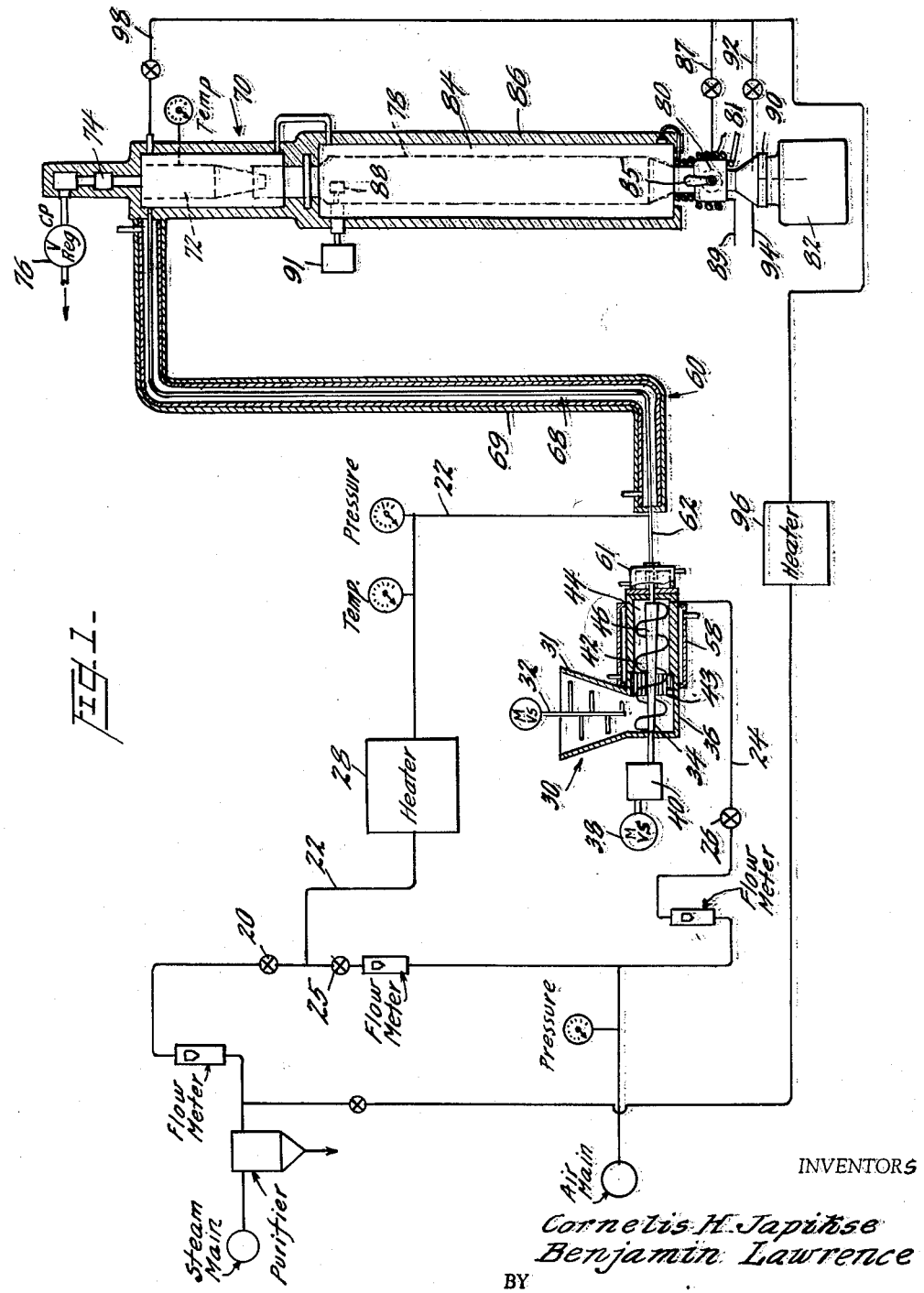
FIG. 1 is a schematic diagram of one embodiment of apparatus suitable for the execution of the process of the invention, in which the flour is treated in part as a flowing fluidized stream and in part as a collected mass; certain of the conduits used therein being shown in one dimension, i.e. as lines, and others in two dimensions, dependent upon their significance.

According to the embodiment of FIG. 1, steam is taken from a suitable source, e.g. a steam main, such as typically available at most manufacturing installations, and passed through a filter (not shown) to remove extraneous material if necessary, and through a so-called purifier to remove any liquid water entrained therein. The purifier may be equipped with a bottom outlet and steam trap for discharging condensed moisture to a sewer (not shown). From the purifier, the steam is delivered to a rotameter or other flow measuring device which discharges through a metering valve 20 to a delivery line 22. The inert gas, which is to be combined with the steam to form the treatment atmosphere, air being employed in this case, is taken from an appropriate source, such as an air main, and is fed to another rotameter or equivalent, the outlet of which communicates through a second metering valve 25 with the delivery line 22. The air supply line may be equipped with a pressure gauge upstream of the rotameter, as may the steam line in the event the steam main pressure is not constant. The two metering valves downstream of the respective rotameters may be replaced, if desired, by automatic proportioning valve feeding the steam and air in any predetermined proportions into delivery line 22. The mixture in line 22 is passed through a heater 28 of any convenient design, such as a high temperature steam heat exchanger, an electrical heater, or the like. Heater 28 functions to raise the temperature of the steam-inert gas mixture to the superheat region prior to its use to fluidize the flour and should, therefore, be capable of supplying a controlled amount of heat to the mixture. Line 22 continues beyond the heater to the point of use and may be provided with control devices, such as temperature and pressure gauges. It is necessary that the flour to be treated be introduced into the system against a certain pressure as required to accomplish the sterilization effectively. Therefore, the system must include a flour feeding stage capable of advancing the flour against this pressure and, simultaneously, providing a seal against loss of this pressure. One arrangement suitable for this purpose is embodied in the system of FIG. 1 under the general designation 30. In this arrangement, the flour to be treated is placed in a feed hopper 31, equipped with a suitably driven agitator 32, which delivers the flour to the intake opening of a rotating feed screw 34 housed in tubular enclosure 36 and powered by variable speed motor 38 through a suitable gear box 40. Agitator 32 can be driven from the motor 38 also but is preferred to be powered by a separate variable speed motor. As can be best seen in FIG. 2, feed screw 34 is of compression design in that the root dimension of the flights 42 continuously diminishes toward the end of the screw. While this result can be achieved by tapering the effective diameter of the screw and its housing toward the outlet end, it is preferred to maintain the diameter of the housing and the overall diameter of the screw constant and gradually enlarge the diameter of the shaft or central body of the screw as shown. It will thus be seen that as the screw rotates, the flour is compressed in the decreasing annular space 44 between the screw shaft 46 and the internal wall of housing 36 as it is fed along the length of screw 34, reaching a condition of maximum compression just in advance of the discharge end. The extent to which the flour is compressed depends upon such variables as the back pressure to be withstood and the length of the maximum compression zone and will be determined accordingly. Preferably, the interior surface of the housing immediately adjacent the intake opening, i.e. in the region where the flour is relatively uncompressed, is longitudinally fluted, as at 43, to promote the forward motion of the flour particles by reducing aimless tumbling. Other feed mechanisms could be devised but the arrangement just described has been found particularly suitable since it is independent of any angle of repose, which is quite high in the case of flour, and is free of difficulties arising from the natural tendency of flour to become compacted.

The measure with which the feed screw is provided in order to break up the compressed flour for subsequent fluidization is best seen in FIG. 2. Thus, the discharge end of screw 34 is reduced stepwise, as at 48, and provided with a series of radially directed picker fingers 50 meshing or interdigitating with a cooperating series of stationary fingers 52 extending inwardly from housing 36, the clearance between the moving and fixed fingers being sufficiently small to remove any lumps and return the flour to substantially its original pulverulent condition. Beyond the picker stage of the feeder, the screw shaft terminates in a smooth extension 54 projecting through a discharge aperture in housing 36 and defining therewith an annular opening 56 through which the flour enters the discharge conduit 59.

If the system is to be operated continuously for long periods of time, i.e. more than a few minutes, it is desirable that measures be taken to avoid prolonged preliminary heating of the flour while in the feeding stage. For example, the screw conveyor housing may be furnished with a cooling jacket 58 through which water can be circulated to absorb heat generated in the flour by friction during compression. Also, the feeding stage may be thermally isolated from the relatively hot fluidizing stage by interposing a heat barrier between adjacent sections of conduit 59, such as a water-jacketed collar 61 (see FIG. 2) likewise cooled with water. In this way, heat is prevented from being conducted from the hot fluidizing stage to the feeding stage through the piping.

In lieu of the feeding arrangement just described, the flour from the feeding stage may be conveyed from the discharge annulus of the feed conveyor to the point of introduction of the fluidizing gas by means of gravity, i.e. by falling through a vertical stack. However, this can result in some of the fluidizing gas feeding back through the stack into the feeding stage, as all parts of a pressurized system tend to reach equilibrium, with a risk of erratic feeding and condensation of steam in the cooler atmosphere adjacent the feeder. Trouble-free operation and positive feeding are better obtained by diverting a portion of the inert gas upstream of the rotameter and introducing the same under pressure via line 24 into the picker section of the screw conveyor through a manifold 55 having a plurality of circumferentially spaced orifices 57 provided for this purpose in the screw housing. This gas, referred to here as "purge gas" assists the cooperating picker fingers in breaking up the compressed flour and places the flour is suspended condition, i.e., in the form of a fine dust, for easy delivery into conduit 59 and thence to the fluidizing stage. Purge gas delivery line 24 may have a separate rotameter or equivalent and a metering valve 26 therein for control purposes.

The fluidizing stage generally designated 60, of the system shown in FIG. 1 comprises a tube 62, which may be either an extension of conduit 59 or a separate member smoothly connected to the end of conduit 59 remote from flour feeding stage 30 in any desired fashion, i.e. by a flange joint or the like (not shown). As a practical matter, the beginning of the stage may be assumed to be the point of introduction of the fluidizing gas. This gas is best admitted to tube 62 with a substantial component of motion in the direction of movement of the flour suspension there. In this way, a Venturi effect is created which assists in drawing the flour suspension into tube 62. Thus, fluidizing gas supply line 22 communicates with a toroidal-shaped manifold 64 (see FIG. 2) encircling fluidizing tube 62 and provided with a plurality of gas inlet ducts 66, preferably three or more in number, extending obliquely from circumferentially spaced points around the manifold to corresponding openings in the wall of tube 62. From the gas injection point forwardly, the fluidizing tube can be disposed in various ways. It can, for example, be straight, curved as in ogee configuration, angled, or even coiled, as may best fit the spacial limitations of a given situation. Sharp bends are preferably avoided to reduce pressure losses and eliminate pockets where the flour could become lodged.

It will be apparent that condensation of the steam component of the fluidizing gas within the fluidizing stage of the system would be just as objectionable as within the feeding stage, if not more so. For this reason, operation of the fluidizing stage should be under isothermal conditions as much as possible. Such conditions can be approximated by insulating the fluidizing tube along its length beginning at the fluidizing gas injection point, so as to minimize heat losses which might create localized zones of a lower temperature. Preferred, however, is the use of a steam jacket 68 surrounding tube 62, to which steam can be supplied at a predetermined temperature. The jacket can, of course, be insulated on the outside, as indicated at 69, to reduce heat losses and protect operating personnel. The jacket may be used simply to provide more or lese adiabatic conditions within the fluidizing tube, or to supply some of the heat needed to sterilize the flour.

The suspension of flour, in the combined fluidizing gas and purge gas passes up through fluidizing tube 62 and into the collection stage generally designated 70. This stage may consist of a cyclone separator 72 of conventional design into which the suspension is introduced tangentially. The gases become separated from the flour in cyclone 72 with the gases passing out of the top through a discharge line 74 terminating in an automatic back pressure valve 76, i.e. a valve capable of maintaining a predetermined pressure in the cyclone and fluidizing tube. The treated flour particles, on the other hand, settle under the influence of gravity out of the bottom of the cyclone and are accummulated in a hold tube 78. The treated flour may be periodically drawn out of the bottom of hold tube 78 through a value 80 into a suitable receptacle or container 82 which has previously been sterilized to avoid recontamination. To permit control of the temperature in the cyclone and hold tube and avoid steam condensation, both are provided with steam jackets 84 having adequate exterior insulation as at 86, and are preferably maintained slightly hotter, say 10° F., than the desired product discharge temperature. The effect of the jacketing is extended to the valve 80 by means of steam tracing 81 connected to the outlet of the hold tube jacket and wrapped around the exterior of the valve and discharging into a steam trap or the like (not shown). Valve 80 which may be of the butterfly, gate or ball type, for example, is preferably enclosed except for its operating member 85, within a housing 83 (see FIG. 4) into which a sterilizing gas, i.e. steam, can be admitted through a valved line 87 and exhausted through a vent 89. In this manner, all of the interior surfaces of valve 80 can be more easily sterilized.

The apparatus in FIG. 1 is intended primarily for batch or semi-continuous operation, the processing of the flour therein being continued until hold tube 78 is filled. This condition cannot be readily determined visually because of the steam-jacketing; consequently, a level indicating probe 88 is placed within the hold tube near its connection with cyclone 72 so as to actuate a suitable signal 91 when the flour has accumulated to the probe level. The probe may be of the vibrating paddle type but other devices for determining the level of the contents of a sealed chamber are known, such as those using gamma radiation, and can be substituted. One convenient point for measuring the equilibrium treatment temperature of the flour is just after entry into the cyclone 72. A thermocouple or other temperature sensing device can thus be arranged as at 93 to measure the temperature at this point and indicate the same on an external gauge 95.

Sterilization of receptacle 82 in place at the bottom of hold tube 78 is often best. The lower end of the hold tube is furnished with a coupling 90 for releasably engaging the mouth of receptacle 82 to retain the same in place. Just above coupling 90 is a valved sterilizing gas supply line 92 passing through the wall of the hold tube and projecting downward to a point well within the receptacle as indicated in solid lines in FIG. 1 and in dotted lines in FIG. 4. In the same region of the hold tube is a bleed vent 94 for exhausting the gas admitted from line 92. The sterilizing gas may be high temperature steam, air, et cetera. As shown, the sterilizing gas is conveniently supplied by tapping the steam supply line upstream of the flowmeter and passing the steam through a heater 96 before feeding it into the lines 87 and 92. The same heated steam may be admitted into the jacket of cyclone 72 and hold tube 78 to heat the same, as by way of a valved line 98.

All possible measures should be taken to reduce the chances of accidental contamination of the flour. Thus, all tubing contacting the flour during and after heating should be of sanitary stainless steel. Also, all connections should be provided with vents for the introduction of high temperature sterilizing air or steam before operation. Appropriate instrumentation for control purposes may, of course, be provided as indicated by the temperature and pressure gauges shown in FIG. 1. For preliminary sterilization of the equipment, pure steam of at least about 300° F. may be circulated through all stages for a few minutes, assisted, if need be, by feeding steam or hot air into all jackets to heat them to the same temperature. Cleaning between production runs is advisable and may be accomplished by circulating a strong detergent solution through all stages. For this purpose, a detergent consisting essentially of trisodium phosphate is quite effective and produces a mirror-like surface on the stainless steel after contact of ½ to 1 hour at a concentration of 1% in water at 150° F.

The rate at which the flour is processed will in large measure be determined by the size of the apparatus. Between 20 and 80 pounds of flour per hour for a fluidizing gas through-put of 0.77 total pound of gas/minute (including purge gas) passing through a one inch I.D. hot fluidizing tube has been found satisfactory. However, the rate of feed is not critical, there being little if any difference in the efficiency of the apparatus in destroying microorganisms provided the temperature in the fluidizing tube remains substantially constant and the flour is heated to such temperature for the stated time. The rate at which the purge gas is used depends upon the rate of injection of flour into the fluidizing gas stream. The amount of purge air need be just sufficient to dislodge and propel the flour from the feeder to the fluidizing gas injection point. About 0.006 pound-mole of air per minute for a flour feed rate of 20–80 pounds/hour will ordinarily suffice, dependent upon the exact feeder design, distance to be moved, etc.

One of the many advantages of a dynamic system such as that just described, wherein the flour is ultimately commingled with the steam-containing atmosphere, is that the temperature of the gas mixture can be adjusted to supply essentially all of the heat needed to raise the flour to treatment temperature. Knowing the through-put rate of the flour and the other factors involved, it is a relatively simple matter to calculate the necessary temperature of the gas mixture. For example, a gas temperature of 400–750° F. will generally suffice to bring the flour up to the operating temperature within the prescribed range. Under such circumstances, the jackets on the fluidizing and collection stages function primarily to supply enough heat to maintain the temperature constant.

The selection of a very lengthy fluidizing tube in order to obtain the desired hold time, while possible, is subject to certain problems. The pressure loss through such a tube tends to be high, requiring the use of higher pressure fluidizing gas and imposing a greater strain upon the ability of the feeding stage to withstand the back pressure. These difficulties are avoided by a relatively short stage in the order of 10–25 feet. It will be appreciated that the dwell time of the flour within a stage of this order of length is only a fraction of that needed for essentially complete sterilization; at typical flow rates, the dwell time would be estimated to be within the range of only about up to 10 seconds. Thus, the essential function of the fluidizing stages of the preferred dimension is not so much to effect sterilization as it is to provide an efficient way of achieving equilibrium treatment temperature with maximum speed, the collection stage being relied upon to continue the treatment at this temperature for the time necessary for sterilization. In fact, it will be seen that the great proportion of the treatment is accomplished within the collection stage.

In a dynamic system designed according to FIG. 1, the system pressure will obviously vary on account of pressure losses. The precise pressure differential will depend upon the tube length, type and number of fitting, et cetera. To give an example, however, a pressure loss of 7–10 p.s.i. has been observed in an experimental system having a fluidizing tube 15 feet in length.

Probably as a result of the flour being maintained in contact with an atmosphere containing a substantial amount of steam, the net change in the moisture content of the flour during treatment is of a low order and does not appear to have a material bearing upon the efficiency of the treatment. Moreover, variations in the length of time the flour is held in the collection stage have no significant effect upon the final moisture content of the flour, a steady state condition in moisture transfer apparently being reached within the fluidization stage. There is, naturally, a greater tendency for moisture to be distilled from the flour as treatment time is increased but any moisture thus lost from the flour merely increases the steam content of the atmosphere. Even in the case of prolonged treatment, however, the amount of moisture lost is too low to alter materially the proportion of steam in the atmosphere.

The effectiveness of the treatment in terms of the sterility achieved can be determined by standard statistical methodology developed in the bacteriology art. One such method employed with good results here utilizes a "most probable number" technique and is an adaptation of a procedure long used in estimating coliform densities in domestic water supplies. According to this procedure, a known amount of treated flour (100 gms.) is introduced aseptically into a container containing a known amount (440 gms.) of sterile bacteriological medium (Fluid Thioglycollate Medium) and mixed vigorously. From the container, replicate decimal aliquots of the mixture are transferred aseptically into a series of tubes either at a single or several different quantitative levels. The tubes are incubated a suitable time (2 weeks at 30–35° C.), then observed. If microbical growth is present as is indicated by any of an increase in turbidity, formation of a surface pellicle, development of odor, or actual microscopic examination, this fact is noted. From the number of positive results relative to the number of samples and their dilution, the "most probable number" (MPN) can be determined from standard reference tables formed, for example, in Standard Methods for the Examination of Dairy Products, 10th Ed. APHA, 1953, or Standard Methods for the Examination of Water, Sewage and Industrial Wastes, 10th Ed., APHA, 1955.

The effect of the treatment upon the functionality of the flour is best ascertained by actual incorporation into particular end products. Different products have different requirements in this respect and flour that may possibly have been excessively degraded for the purposes of one product may be quite acceptable for purposes of another product. It will also be appreciated that such damage to the functionality of the flour as may unavoidably occur can be compensated for by the choice of a flour for treatment that is excessively strong for the particular product in mind.

A more detailed understanding of the invention will be further facilitated by the following illustrative examples. In Examples I–III, sterility tests were performed in the manner already described, except the flour was considered sterile if the test samples were all negative, no attempt being made to translate these results into a statistically meaningful value, as a MPN.

EXAMPLE I

Commercial American Beauty flour (a soft cake flour) having a moisture content adjusted to 20% by weight is introduced into a plurality of stainless steel tubes, 10 in. long by ¼ I.D., provided with a centrally located thermocouple in a ⅟₁₆ inch well to measure the temperature of the contents. The tubes are sealed, divided into two sets, and immersed in a variable temperature oil bath. The bath is maintained at 268° F. for one set and at 286° F. for the other set, and the temperature indications provided by the thermocouples are observed in relation to time. The first set requires 6 minutes to reach bath temperature and is held at such temperature for 2.5 additional minutes before being removed. The second set requires about 1¾ minutes to reach 260° F., plus about 6 minutes to achieve bath temperature, and is held at the latter temperature for only ¼ minute before being removed. At the stated maximum conditions, the indicated moisture content will provide an atmosphere within the tubes containing between about 40 and 80 mol percent steam at a pressure of about 20 p.s.i.g. Both sets are cooled by immersion in cold water, needing about the same length of time to return to room temperature as was consumed in heating. The flour is removed from the tubes and tested for sterility. All test samples are sterile. The baking characteristics of the flour are determined by combining the contents of a number of similarly treated tubes and using the same for the production of yellow cakes by a standard laboratory formulation with additional ingredients of normal quality. From the texture of the resultant cakes, it is evident that both batches of flour have suffered some damage, with the batch exposed to the higher temperature being affected to a somewhat greater extent than the other, but in neither case is the damage sufficient to render the flour unusable.

EXAMPLE II

Example I is repeated, using samples of flour having moisture contents of 9.2, 12.8 and 17.5% and an oil bath temperature of 268° F. All of the tubes reach bath temperature within 6 to 6¼ minutes and are given a total treatment time of 7 minutes. Sterility tests give negative results showing the samples to be sterile. Baking tests are omitted. Under the stated conditions, the steam content of the atmosphere within the tubes is about 40 mol percent, 50 mol percent, and 70 mol percent, respectively. The equilibrium pressure is substantially the same in all cases, about 19.5 p.s.i.g.

When the above experiment is repeated with flour containing 9.2% moisture, filling the tubes to 90% and 60% of maximum capacity, the equilibrium pressure is about 17 and 15.5 p.s.i.g., respectively.

EXAMPLE III

Example I is repeated with commercial pancake flour having a moisture content of about 14%, at bath temperature of about 263–266° F. In all cases having a total exposure time of at least 6 minutes, sterility is obtained. From about 4–6 minutes is needed to reach bath temperature. The flour can be made into acceptable pancakes. The steam content of the treatment atmosphere is estimated to be 50 mol percent and the maximum pressure 11 p.s.i.

When this experiment is repeated with flour both naturally contaminated as above and inoculated with a test organism, P.A. 3679, at a concentration of 5,000–10,000 spores/gm. of flour at pressures adjusted by means of a needle valve provided at the tube outlet to levels varying from 0–11 p.s.i.g. at a bath temperature of 268° F. and a total immersion time of 8.5 minutes, sterility is not obtained below 5 p.s.i.g. and is invariably obtained above 8 p.s.i.g. Extending the treatment time of the samples maintained at 1 p.s.i.g. to 15 and 30 minutes does not produce any improvement.

EXAMPLES IV–XLVIII

A number of samples of Queen Quality flour (an intermediate grade, all purpose flour) having an initial moisture content of about 10% by weight and an initial contamination of about 4000 organisms/gm. are processed in a system designed in accordance with FIG. 1, using as the fluidizing tube, a 1 in. I.D. stainless steel tube 15 feet in length from the gas injection point to the connection with the cyclone and as the hold tube, a 2 inch I.D. and 30 inch stainless steel tube. The flour is introduced by the feeding stage at a rate of about 20 pounds/hour, and total gas flow is about 0.6 pound/minute, of which .12 pound/minute air is passed through the feeder as purge gas. The proportions of air and stream in the fluidizing gas is maintained constant for all samples at 25/75 mol percent air/steam. This mixture is heated to about 550° F. The temperature of the heated jacketing on the fluidizing and collection stages is adjusted to hold flour at the temperature desired for sterilization. The temperature of the flour within the hold tube is observed and recorded as the "hold temperature." The pressure valve at the outlet of the cyclone is set to maintain a predetermined minimum pressure which is recorded. The length of time the flour is retained in the hold tube before being removed and cooled is observed as the "hold time." The flour is cooled by removing the flour receptacles and cooling in ambient air or in some cases by placing the receptacles in a freezer maintained at 0° F. In ambient air, the flour temperature drops below the starch degradation point within about 10 minutes. The same condition is obtained in the freezer within about 5 minutes. More rapid cooling is obtained in some cases by submerging the receptacles in cold water, and can be accelerated further if accompanied by agitation. Sterility tests according to the "Most Probable Number" procedure are performed and are recorded on the basis of the "Most Probable Number" (MPN) of organisms in a 20 gm. sample of flour. In a number of instances, a gross sterility test is carried out as a check on the results of the MPN test. For this purpose, a quanitiy of treated flour of approximately 100 gm. is mixed with 500 gm. of sterile thioglycolate culture medium, incubated for 2 weeks and observed for evidence of organism growth.

The pressure at the cyclone outlet, the temperature of the flour in the hold tube, the hold time and the results of the sterility tests for the respective samples are summarized in the following tabulation. The results of the gross sterility test, where performed, are indicated alongside the MPN value by (c) if the evidence of growth is positive and by (u) if the evidence of growth is negative. For example, a MPN (organism/20 gm.) of 0 combined with a (c) indicates that the incidence of contamination is too low to appear in a 20 gm. sample but that a 100 gm. sample does contain at least one organism.

Table I

STERILITY TESTS

| Example No. | Outlet Pressure p.s.i.g. | Hold Temperature (° F.) | Hold Time, Minutes | MPN Org./20 g. |
|---|---|---|---|---|
| IV | 10 | 303 | 4 | 0(c) |
| V | 10 | 297 | 5 | 0(u) |
| VI | 20 | 300 | 0 | 16 |
| VII | 20 | 293 | 6 | 0(u) |
| VIII | 20 | 292 | 4 | 0(c) |
| IX | 20 | 295 | 4 | 0(c) |
| X | 20 | 292 | 4 | 0(c) |
| XI | 10 | 250 | 10 | >24 |
| XII | 10 | 292 | 4 | >24 |
| XIII | 10 | 285 | 8 | 5 |
| XIV | 10 | 286 | 6 | 16 |
| XV | 10 | 288 | 6 | 9 |
| XVI | 10 | 315 | 4 | 5 |
| XVII | 10 | 307 | 4 | >24 |
| XVIII | 10 | 295 | 6 | >24 |
| XIX | 10 | 291 | 6 | 5 |
| XX | 10 | 307 | 6 | 0(c) |
| XXI | 10 | 308 | 6 | 9 |
| XXII | 10 | 298 | 6¾ | 9 |
| XXIII | 10 | 285 | 6 | 2 |
| XXIV | 10 | 288 | 6 | 5 |
| XXV | 10 | 298 | 6 | 5 |
| XXVI | 10 | 299 | 6 | >24(c) |
| XXVII | 10 | 298 | 6 | >5(c) |
| XXVIII | 10 | 295 | 6 | 9(c) |
| XXIX | 10 | 295 | 6 | 9(c) |
| XXX | 20 | 294 | 5 | 2(c) |
| XXXI | 20 | 301 | 5 | >24(c) |
| XXXII | 20 | 291 | 5 | 0(c) |
| XXXIII | 20 | 290 | 5 | 2(c) |
| XXXIV | 20 | 292 | 5 | (c) |
| XXXV | 20 | 285 | 5 | 0(c) |
| XXXVI | 20 | 298 | 5 | 0(u) |
| XXXVII | 20 | 292 | 5 | 0(u) |
| XXXVIII | 20 | 301 | 5 | 0(u) |
| XXXIX | 20 | 290 | 5 | 0 |
| XL | 20 | 295 | 5 | 0(u) |
| XLI | 20 | 288 | 5 | 0(u) |
| XLII | 20 | 294 | 5 | 0(u) |
| XLIII | 20 | 290 | 5 | 0(u) |
| XLIV | 20 | 292 | 5 | 0(u) |
| XLV | 20 | 288 | 5 | 0(u) |
| XLVI | 20 | 292 | 5 | 0(c) |
| XLVII | 20 | 290 | 5 | 2(c) |
| XLVIII | 20 | 291 | 5 | 0(u) |

As will be apparent from the variation in the results of the sterility tests as recorded above, such results cannot be interpreted as an absolute indication of the efficacy of the sterilization treatment. A certain amount of handling of the flour is inevitable in the course of these tests, during which the flour is from time to time exposed to the atmosphere. Chance contamination is, accordingly, possible despite the most elaborate precautions. However, the very drastic reduction in the level of contamination achieved without exception is convincing evidence of the value of the treatment in obtaining essential sterilization.

Samples from 26 experimental runs utilizing steam in the fluidizing gas are compared as to odor with 49 samples from experimental runs performed in the same manner and under substantially the same conditions except that steam is omitted. The comparison is made by a blind grading of the odor of the samples on a scale of 0 (no change) to 3 (strong change). A sample having an odor of at least 2 is unsuitable for use in most culinary products. The mean grade of the two categories of samples is set forth in Table II.

Table II

ODOR TESTS

| Type of Treatment | No. Samples Graded | Odor (Mean Grade) |
|---|---|---|
| Steam-Air Fluidized | 26 | 0.5 |
| Air Only Fluidized | 49 | 2.2 |

The odor of the samples fluidized in air only is characterized as "chemical," "medicinal" or "amine-like."

Samples of flour processed in the same manner as those summarized in Table I but with the variable conditions slightly different are formulated into a pancake batter according to a standard laboratory receipe and baked into pancakes which are sampled and graded by a qualified panel according to a standard organoleptic edibility grade where 10 is the highest value, 8 is normal, and 5 is the minimum for acceptability. A control prepared from untreated flour is included for comparison. The pertinent treatment conditions and panel grades are set forth in Table III.

Table III

PANCAKE BAKING TESTS

| Outlet Pressure, p.s.i.g. | Hold Temperature (° F.) | Hold Time (Min.) | Edibility (Grade) |
|---|---|---|---|
| 10 | 300 | 6 | 5 |
| 10 | 295 | 6 | 6 |
| 10 | 285 | 6 | 6 |
| 10 | 290 | 6 | 5 |
| 20 | 298 | 4 | 7 |
| 20 | 292 | 4 | 7 |
| 20 | 302 | 5 | 7 |
| 20 | 302 | 5 | 7+ |
| Control (untreated flour) | | | 8 |

In general, the treated samples require the addition of more water to form a readily pourable batter than does the untreated sample. The presence of this extra moisture makes the resultant pancakes wetter and slightly more succulent to the panel. However, the treated flour gives a creditable performance as a whole for this purpose, particularly in the case of the samples processed at the higher outlet pressure.

Having thus described the invention, what is claimed is:

1. A method of essentially sterilizing pulverulent flour contaminated by microorganisms, said method comprising the steps of rapidly and substantially uniformly heating said material to a temperature within the range of about 260–310° F., maintaining said material at a temperature within said range in contact with an atmosphere containing steam in the proportion of about 10–80 mol percent under a pressure of about 5–40 p.s.i.g. for a total time of about 1–10 minutes and sufficient to essentially destroy the microorganisms therein, and rapidly cooling said material to a temperature below the degradation point of the starch.

2. A method as in claim 1 wherein said flour is heated from a temperature below the starch degradation point to a temperature within said ranges in not more than about 5 minutes and is cooled back down from the latter temperature to the former temperature in not more than about 10 minutes.

3. A method as in claim 1 wherein said flour is heated to said temperature in not more than about 1 minute.

4. A method as in claim 1 wherein said temperature is within the range of 280–300° F., said atmosphere contains about 30–75 mol percent steam and said pressure is about 10–30 p.s.i.g.

5. A method as in claim 1 wherein said heating step is carried out by suspending said flour in a flowing stream of said atmosphere.

6. A method as in claim 5 wherein said flour is separated from said gas stream and maintained under an atmosphere derived from said stream at said temperature and pressure for said time.

7. A method of essentially sterilizing pulverulent flour contaminated by microorganisms, which method comprises the steps of injecting said flour into a moving stream of a fluidizing gas to form a suspension of flour in said gas, heating said suspension to a temperature within the range of about 260–310° F., said gas containing steam in the proportion of about 10–80 mol percent and being maintained under a pressure of about 5–40 p.s.i.g.; separating said flour from said stream while continuing to maintain the separated flour at said temperature in contact with an atmosphere of said gas; removing said separated flour from said last-mentioned contact after said flour has been exposed to said temperature and said gas for a total time of about 1–10 minutes and sufficient to essentially destroy said microorganisms; and rapidly cooling the removed flour to a temperature at least below the degradation point of the starch.

8. A method of essentially sterilizing pulverulent flour contaminated by microorganisms, which method comprises the steps of injecting said flour into a moving stream of a fluidizing gas to form a suspension of flour in said gas, said gas prior to injection of the flour therein having a temperature sufficient to heat the resultant suspension to a temperature within the range of about 260–310° F., said gas containing steam in the proportion of about 10–80 mol percent and being maintained under a pressure of about 5–40 p.s.i.g.; separating said flour from said stream while continuing to maintain the separated flour at said temperature in contact with an atmosphere of said gas; removing said separated flour from said last-mentioned contact after said flour has been exposed to said temperature and said gas for a total time of about 1–10 minutes and sufficient to essentially destroy said microorganisms; and rapidly cooling the removed flour to a temperature at least below the degradation point of the starch.

References Cited in the file of this patent
UNITED STATES PATENTS

| | | |
|---|---|---|
| 1,380,334 | Sutherland | May 31, 1921 |
| 2,394,064 | Hutchinson | Feb. 5, 1946 |

FOREIGN PATENTS

| | | |
|---|---|---|
| 263,760 | Great Britain | Jan. 12, 1928 |